United States Patent
Nini et al.

[11] Patent Number: 5,132,134
[45] Date of Patent: * Jul. 21, 1992

[54] REMOVAL OF MALIC ACID FROM COFFEE

[75] Inventors: David Nini, Riverdale, N.Y.; Ronald H. Skiff, Whippany, N.J.; Mark H. Karmiol, Warwick, N.Y.; Thomas H. Parliment; Fredric Kleiner, both of New City, N.Y.; Parviz Ghossi, Tarrytown, N.Y.

[73] Assignee: Kraft General Foods, Inc., Northfield, Ill.

[*] Notice: The portion of the term of this patent subsequent to Dec. 11, 2007 has been disclaimed.

[21] Appl. No.: 625,590

[22] Filed: Dec. 11, 1990

Related U.S. Application Data

[63] Continuation-in-part of Ser. No. 348,627, May 8, 1989, Pat. No. 4,976,983.

[51] Int. Cl.⁵ .............. A23C 9/14; C12H 1/04
[52] U.S. Cl. .................... 426/271; 426/490; 426/594; 426/595; 426/629
[58] Field of Search ......... 426/594, 595, 629, 271, 426/490

[56] References Cited

U.S. PATENT DOCUMENTS

| | | | |
|---|---|---|---|
| 4,205,092 | 5/1980 | Mattick et al. | 426/271 |
| 4,278,696 | 7/1981 | Magnolato | 426/422 |
| 4,666,721 | 5/1987 | Norman et al. | 426/271 |
| 4,676,988 | 6/1987 | Efstathiou et al. | 426/271 |
| 4,976,983 | 12/1990 | Hirsch et al. | 426/594 |

FOREIGN PATENT DOCUMENTS

| | | | |
|---|---|---|---|
| 3239219A | 4/1984 | Fed. Rep. of Germany | 426/271 |
| 3400768A | 7/1985 | Fed. Rep. of Germany | 426/271 |

Primary Examiner—Joseph Golian
Assistant Examiner—Evan Federman
Attorney, Agent, or Firm—Thomas A. Marcoux; Linn I. Grim; Thomas R. Savoie

[57] ABSTRACT

Malic acid is removed from coffee to provide a coffee product which will evoke a decreased gastric acid response after ingestion. Malic acid is removed by contacting an aqueous coffee extract, which may be a green or brown extract, with an ion exchange resin capable of exchanging malic acid in the extract. Demalation of a ready-to-drink coffee brew may be effected substantially immediately after preparation of the brew in a home brewer or the like. A malic acid-lean extract can be used to extract malic acid from coffee solids to produce demalated coffee solids. Demalation is preferably accomplished without removing excessive amounts of chlorogenic acid. Coffee products in accordance with the invention are preferably decaffeinated.

13 Claims, 2 Drawing Sheets

REMOVAL OF MALIC ACID FROM COFFEE

CROSS REFERENCE TO RELATED APPLICATION

This application is a continuation-in-part of co-pending application Ser. No. 07/348,627, filed May 8, 1989, now U.S. Pat. No. 4,976,983, the disclosure of which is incorporated by reference herein.

TECHNICAL FIELD

The present invention relates to coffee processing, specifically to the removal of malic acid from coffee to provide a coffee product which will evoke a decreased gastric acid response after ingestion.

BACKGROUND OF THE INVENTION

As is more fully explained in co-pending application Ser. No. 07/348,627, now U.S. Pat. No. 4,976,983, normal food intake which is known to lead to gastric acid secretion because of stomach distension and because of the action of only a few commonly ingested food constituents such as caffeine, calcium ions, alcohol, and the digestion products of protein.

Early attempts in the food art to produce a "stomach friendly" coffee, that is a coffee which will produce less or no heartburn in susceptible individuals, centered upon the deacidification of coffee such as by chemically neutralizing the acids present in coffee by the addition of a food-grade alkaline agent.

Farr and Horman (U.S. Pat, Nos. 4,160,042 and 4,204,004) teach a method of reducing the caffeine treatment with particles of carob pods which absorb the caffeine and chlorogenic acid. Magnolato (U.S. Pat. No. 4,278,696) teaches a process for deacidifying a coffee extract by contacting it with chitosan in divided form and recovering the resultant deacidified extract. This patent stresses the importance of the removal of chlorogenic acid since it is the predominant acid found in coffee. However, other acids including malic acid are also reduced by the treatment. Another process, described in U.S. Pat. No. 4,317,841 to Brambella and Horman, teaches reduction in the acidity of a coffee extract by electrodialysis. The non-cathodic extract is collected, contacted with subdivided chitosan and, after removal of the chitosan, is mixed with at least a part of cathodic extract to provide a deacidified coffee extract.

Published Patent Application DE 3,239,219, published Apr. 26, 1984, discloses contacting an aqueous extract of green coffee beans with an anion-exchange resin, the resin having been loaded by adsorption with at least one nonacidic coffee extract constituent in order to exchange the acids present in the aqueous extract to produce a reduced chlorogenic acid green coffee. The object is to produce a coffee product which would reduce irritation of stomach mucosa and not cause stomach acidity.

PCT International Publication Number WO 87/04598 having a publication date of Aug. 13, 1987 teaches a coffee product with an increased chlorogenic acid content. This elevated chlorogenic acid level is said to improve the digestibility of physiology studies reported in the patent application were performed on human male and female subjects However, the poor methodology utilized in the studies including the lack of proper scientific controls render the results questionable at best.

Co-pending application Ser. No. 07/348,627, now U.S. Pat. No. 4,976,983, discloses production of a stomach friendly coffee by selectively removing malic acid and without sacrificing the large percentage yield loss and flavor penalty which results from the removal of a majority of chlorogenic acid as taught by prior art references.

It is an object of the present invention to provide a method for removing malic acid from coffee. It is a further object of the invention to provide a method of removing malic acid from coffee which method includes the use of an ion exchange resin.

BRIEF SUMMARY OF THE INVENTION

The foregoing and other objects which will be apparent to those of ordinary skill in the art are achieved in accordance with the invention by providing a process for removing malic acid from a coffee product comprising contacting a malic acid-containing aqueous coffee extract with an ion exchange resin capable of exchanging malic acid in the aqueous extract, and recovering a malic acid-lean aqueous coffee extract having a reduced malic acid content, and by providing a device for removing malic acid from an aqueous coffee extract comprising a first porous member capable of supporting roast and ground coffee and having a porosity sufficient to permit an aqueous extract of said roast and ground coffee, including extracted coffee solids, to pass therethrough, and a second porous member fixedly secured to said first porous member and positioned, in use, below and spaced from said first support member, ion exchange resin capable of exchanging malic acid in an aqueous extract of roast and ground coffee in the space between said first and second support members, and means peripherally closing said space for forming, with said first and second support members, a compartment for retaining said ion exchange resin.

DESCRIPTION OF PREFERRED EMBODIMENTS

There follows a detailed description of preferred embodiments of the invention, including the best mode of carrying out the invention, including the drawings in which.

Figure 1:
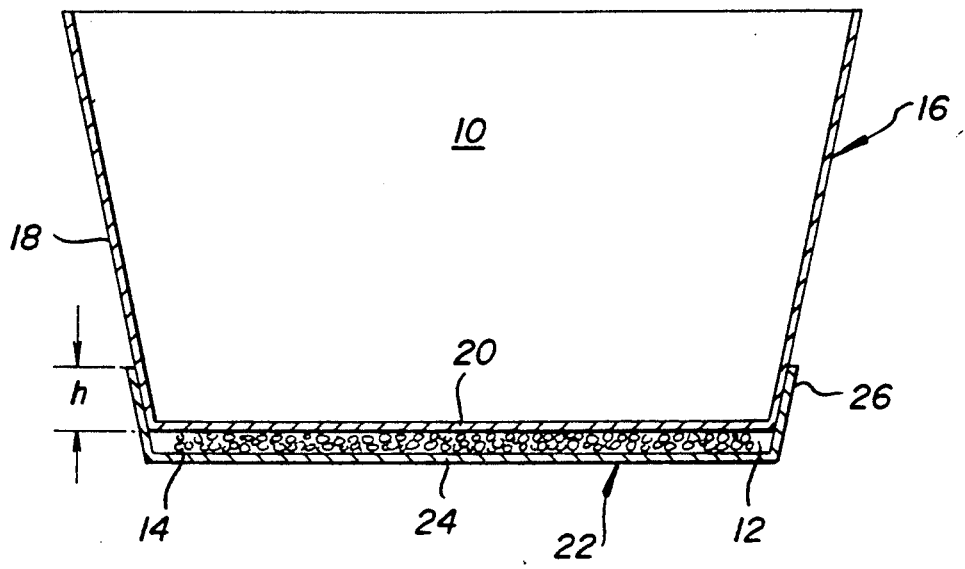
FIG. 1 is a diagrammatic sectional side elevation view of a first embodiment of a device for removing malic acid from an aqueous coffee extract.

In accordance with the invention, malic acid is removed from a malic acid-containing aqueous extract of coffee solids by contacting the extract with an ion exchange resin capable of exchanging the malic acid. A malic acid-lean aqueous coffee extract, having a reduced malic acid content, is recovered. The malic acid content of the extract is readily reduced by ion exchange. It is preferred to reduce the malic acid content of the extract by at least 55%, more preferably by at least 80%. The degree of demalation can vary especially if the demalated product is later admixed with a coffee product naturally low in malic acid, i.e. Robusta coffee.

The aqueous extract can be either a green extract, i.e. an extract of soluble green coffee solids, or a brown extract, i.e. an extract of soluble roasted coffee solids.

The demalated extract can be used to extract malic acid from coffee solids. For example, demalated green extract can be used to extract malic acid from green coffee beans, to produce a demalated green coffee solids product. The malic acid-containing extract resulting from the green bean extraction step can be recycled to the ion exchange step and the resulting malic acid-lean extract can be recycled to the coffee extraction-step to extract malic acid from coffee solids. In this way the extract is repeatedly recycled through the ion exchange and coffee extraction steps while green coffee solids are being subjected to extraction of malic acid.

Where the extract is a brown extract, the demalated extract can be a coffee product such as a liquid coffee product having a reduced malic acid content, or it can be processed further to provide a coffee product such as a liquid or soluble coffee product having a reduced malic acid content. In a preferred embodiment, the brown extract is a ready-to-drink coffee brew and ion exchange is effected substantially immediately after the brew is prepared, particularly in a home brewer. In another embodiment, the malic acid-lean brown extract can be used to extract malic acid from roast coffee solids to produce a demalated roast coffee solids product. Malic acid extracted from the coffee solids introduces malic acid into the brown extract, and the brown extract, now containing malic acid, can be resubjected to ion exchange to reduce its malic acid content. Thus, the brown extract can be repeatedly recycled through the ion exchange and coffee extraction steps while roasted coffee solids are being subjected to extraction of malic acid.

As disclosed in co-pending application Ser. No. 07/348,627, now U.S. Pat. No. 4,476,983, the malic acid content of coffees varies considerably. For example, green Robusta coffees tend to have generally lower malic acid content of, typically, 0.12 to 0.36% on a dry weight basis. Green Arabica coffees, on the other hand, have a generally higher malic acid content of, typically, 0.38 to 0.67% on a dry weight basis. Roast and ground Robusta coffees typically have a malic acid content of about 0.05 to 0.2% dry weight basis and roast and ground Arabica coffees typically have a malic acid content of about 0.3 to 0.5% dry weight basis. A typical green extract of a Robusta coffee would have a malic acid content of about 0.1 to 0.3% by weight based on the weight of total coffee solids in the extract and a green extract of a Arabica coffee would typically have a malic acid content of about 0.3 to 0.5% by weight based on the weight of total coffee solids in the extract. The malic acid content of typical brown extracts of Robusta and Arabica coffees, respectively, would be 0.1 to 0.9% and 0.35 to 1.6% by weight based on the weight of the total coffee solids in the extract at solids yields of 25 to 60% from the roasted coffee.

During demalation of the malic acid-containing coffee extracts, it is preferred to remove at least 55% of the malic acid content of the extract, more preferably at least 80%, and optimally at least 85%. Substantially complete removal of the malic acid, such that the extract is essentially free of malic acid, can also be achieved by ion exchange.

During extraction of malic acid-containing coffee solids, it is preferred to extract a majority of the malic acid content of the coffee solids, preferably at least 55%, and more preferably at least 80%. It is a preferred aspect of the present invention that the ion exchange resin is highly selective for malic acid thus producing a malic acid lean extract which extracts mainly malic acid from coffee solids, resulting in minimal loss of non-malic acid soluble coffee solids. It is thus possible, and preferred, to preserve the content of chlorogenic acid and other acids in the coffee solids while extracting a significant quantity of malic acid. More preferably, a majority of the malic acid is extracted while at least 55% of the chlorogenic acid content of the coffee solids is retained. Even more preferably, at least 55% of the malic acid content is extracted while at least 75% of the chlorogenic acid is retained. Demalated roasted coffee solids in accordance with the invention preferably contains basis and less than half of the malic acid content that the roasted product would have in the absence of demalation.

Extraction of malic acid from malic acid-containing coffee which may be carried out in conventional extraction equipment, but is preferably effected in an atmospheric pulse column in which coffee solids are periodically pulsed downwardly through a vertical column while malic acid lean coffee extract is passed upwardly through the bed of coffee solids. Such columns, and their operation, are described more fully in co-pending application Ser. No. 07/348,627, now U.S. Pat. No. 4,976,983.

Since caffeine is a known stimulant of the production of digestive acid in the stomach, it is preferred that the coffee solids are decaffeinated. Preferably, at least 75%, more preferably at least 90%, and still more preferably at least 95% of the caffeine content of the coffee is removed by any conventional decaffeination technique. Decaffeination is preferably effected prior to extraction of malic acid in accordance with the invention and is preferably effected on green coffee solids.

Preferably the anion of the ion exchange resin is the anion of a food grade acid native to coffee such as acetic acid. Suitable ion-exchange resins include "DOW XU 40373" and "DOW XUS 40163" resins as well as other anion exchange resins which would be apparent to those skilled in the art The amount of resin used will depend, of course, on the amount of malic acid in the coffee solids and the desired extent of malic acid reduction. It is preferred to employ about 0.05 to 0.25 parts by weight of resin per part by weight of coffee solids, dry basis. The resin, if not in a form which will readily exchange malic acid for its anions, can be converted to such a form and then contacted with the malic acid rich coffee extract. By way of example, the "DOW XUS 40373" resin in the hydroxide form can be backwashed and converted to the acetate form using acetic acid. Upon contacting the acetate form of the resin with malic acid rich coffee extract, the resin will exchange malic acid for acetate ions. The ion-exchange process will result in a malic acid lean coffee extract which may be used as such or which may be used to contact coffee solids in an extraction column or other apparatus, and thereby remove malic acid from the coffee solids.

The coffee product, whether it be a soluble coffee product, i.e. freeze-dried, spray-dried or extruded powder; a roasted whole bean product, roast and ground coffee, or liquid coffee will preferably contain less than 7.8 mg of malic acid per cup (160 ml) on an as-consumed basis. The term "as-consumed basis" refers to the product in its reconstituted or brewed form as it is eventually consumed by the coffee consumer, i.e. soluble coffee reconstituted with hot water or roast and ground coffee after brewing. The preferred coffee product shall contain from 0 to 7.8 mg of malic acid per cup on an as-consumed basis.

The following examples illustrate certain embodiments of the present invention. The examples are not meant to limit the invention beyond what is claimed below.

EXAMPLE 1

Green coffee is demalated via a single pass aqueous green coffee extract process using ion exchange resins to exchange malic acid in the green coffee extract for acetic acid.

A 6-inch diameter by 8-foot tall jacketed glass column is filled with DOW XUS 40373 resin in the hydroxide form to a height of 4 feet (20,300 cc.). The resin is backwashed and converted to the acetate form using acetic acid by means commonly employed with resins.

A total of 13.6 gallons of green coffee extract having a total solids concentration of 20% and a malic acid content of 0.23% (as is) is demalated by being passed over the ion exchange resin at a temperature of 180° F., and collected in three equal aliquots of 4.5 gallons having a malic acid concentration (on an as is basis) of 0.048%, 0.021% and 0.046% respectively to achieve an overall demalation of the extract of about 83.3%. Due to the dilution effects of water absorbed within and around the resin beads, the initial total solids concentration of the extract feed is diluted to 14.4%, 15.5% and 16.7% respectively in the three aliquots. Chlorogenic and acetic acid contents of the feed extract are measured at 4.94% (as is) and 0.14% (as is) respectively. The demalated extract aliquots contain (on an as is basis) 0.46%, 0.89% and 1.59% chlorogenic acid respectively. The acetic acid content of the demalated extract increased to approximately 1.8% (as is).

The second 4.5 gallon aliquot of demalated extract is used to extract malic acid from 1 kilogram of decaffeinated whole green Colombian coffee beans in a 3-inch diameter by 4-foot tall jacketed glass column at 180° F., 200 mls/min flowrate in 1.5 hours. After passing over the beans, approximately 4.2 gallons of extract is collected containing 16.7% total solids, 0.04% (as is) malic acid, 1.1% (as is) chlorogenic acid and 1.96% (as is) acetic acid.

After demalation, 1 liter of distilled water is used to wash the extract from the beans. The beans weight of 985 grams. Analysis of the green coffee before and after demalation is as follows:

|  | % Moisture | % Malic Acid, d.b. | Chlorogenic Acid, d.b. | % Acetic Acid, d.b. | % Caffeine d.b. |
| --- | --- | --- | --- | --- | --- |
| Starting Colombians | 10.99 | 0.390 | 7.07 | 0.170 | 0.056 |
| Demalated Colombians | 12.94 | 0.103 | 5.08 | 1.86 | 0.065 |

As shown, a 73.6% dry basis demalation of the green coffee is achieved and 71.9% of the chlorogenic acid is retained within the green coffee.

EXAMPLE 2

A set up of R&G coffee/Filter/Resin/Filter is described in this process. Roast and ground coffee is placed on a first coffee filter; ion exchange resin is spread on a second coffee filter in such a way that a layer of ion exchange resin, approximately 0.5" thick, is formed. The resin and filter combination are placed underneath the coffee and filter, and the complete set up is placed in the basket of a home coffee maker.

The coffee brew (brown coffee extract) is produced in the conventional manner by brewing 58.2 grams of roasted ground coffee with 1800 milliliters of boiling water in the home brewer. The coffee brew, which contains about 0.86% total coffee solids, then comes in contact with 8.7 grams of dry resin (15 grams as is; 42% moisture) of the strong anion exchange resin, XUS 40163 in the acetate form, which exchanges malic acid for the acetate ion, thus producing ready-to-drink malic acid reduced brewed coffee having a total solids content of 0.76%.

A coffee brew prepared according to the recipe above and using the XUS 40163 resin in the acetate form according to the described set up, is sampled and analyzed for malic acid, total coffee solids, pH and titratable acidity. A control brew, which is prepared under the same conditions (58.2 grams of R&G coffee with 1800 mls boiling water) but without the resin is used for comparison. The results show that 77.78% of the available malic acid in the brew is removed across the resin bed and that there is an 11.6% solids loss. The pH of the demalated coffee brew increases about 2% (from 4.86 to 4.97) in comparison to the control brew. Organoleptic evaluation shows the malic reduced brew to be slightly less acidic and very close to the control in aromatic coffee attributes. Overall the freshly brewed malic reduced coffee is of comparable quality to the freshly brewed control.

As shown in Example 2, malic acid may be removed from a coffee beverage as the beverage is being brewed. This embodiment of the invention is conveniently carried out using an infusion device which holds an ion exchange resin in a porous structure which permits a malic acid-containing brew to flow through the infusion device much like in a home coffee maker or the like.

Suitable infusion devices of this type are shown in the drawings. The infusion device 10 illustrated in FIG. 1 is similar to a conventional truncated cone-type of infusion device, circular in plan view, of the type widely used in home coffee makers, but provided with a compartment 12 in which is located a predetermined amount of ion exchange resin 14. The device is conveniently made by simply stacking two conventional truncated cones together with one cone inside one another, leaving a space between the cone bottoms to form compartment 12, and securing the cones together by gluing or stitching or the like around the periphery. Ion exchange resin 14 is, of course, located in compartment 12 before it is closed at its periphery.

The entire structure is conveniently made of conventional filter paper-type of porous material suitable for use in coffee makers and in coffee infusion bags and the like which will retain particulate ion exchange resin and roast and ground coffee but which will pass an aqueous coffee extract, including extracted coffee solids. In order to conserve materials, one of the two cones may be reduced in height relative to the other cone as shown, the height being sufficient to provide a suitable area overlapping the other cone for securing the cones together. Thus, in FIG. 1, inner cone 16 is conveniently a conventional filter paper-type of coffee infusion basket having, in use, a corrugated or plane side wall 18 and a substantially planar bottom wall 20, and outer cone 22 is of substantially the same size and shape, but with a much reduced side wall height, such that inner cone 16 stacks inside outer cone 22 leaving a space between the bottom wall 20 of inner cone 16 and bottom wall 24 of outer cone 22. The height of side wall 26 of outer cone 22 is much less than that of side wall 18 of inner cone 16, the area of overlap ("h" in FIG. 1) being at least sufficient to facilitate joining the inner and outer cones together. It will be readily apparent that the cones could be reversed, with cone 22 being secured in position inside cone 16, again with ion exchange resin provided in a closed compartment between the stacked cones.

The infusion device depicted in FIG. 1 is used in the same manner as a conventional device of this type. Hot water is flowed through the device, previously provided with an amount of coffee, supported on porous wall member 20, to form a brew. The brew flows downwardly through porous bottom wall member 20 into compartment 12 where it contacts ion exchange resin 14 which effects demalation of the brew. Demalated coffee brew then flows downwardly out of the device through porous bottom wall member 24.

The amount of ion exchange resin in compartment 12 is sufficient to effect substantial demalation, preferably at least 50% demalation, of the coffee in inner cone 16. The amount of coffee in a device of this type is often quite variable, typically an amount sufficient to brew from two to ten or twelve cups of coffee. The amount of resin in compartment 12 is, therefore, sufficient to effect substantial demalation, preferably at least 50% demalation, of the largest nominal amount of coffee designed to be brewed in any particular infusion device. Thus, for an infusion device designed to brew from two to twelve cups of coffee, the amount of ion exchange resin in compartment 12 would be sufficient to effect such demalation of twelve cups of coffee.

Figure 2:
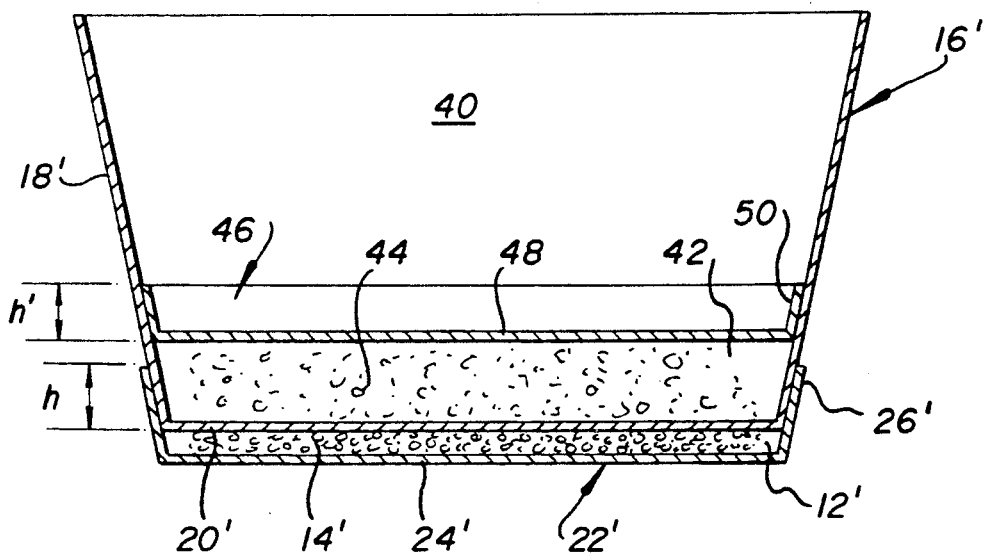
FIG. 2 is a diagrammatic sectional side elevation view of a second embodiment of a device for removing malic acid from an aqueous coffee extract.

The infusion device 40 of FIG. 2 is similar to that of FIG. 1, with numerals which indicate like parts being the same but bearing a prime in FIG. 2. In this device, however, a second compartment 42, bearing a fixed measured amount of coffee 44, is provided above compartment 12' by securing a third truncated cone-shaped porous filter paper member 46 inside cone 16'. Because the amount of coffee in the device is fixed, the amount of ion exchange resin is based on that fixed amount in accordance with the invention. Compartment 42 is formed between porous bottom wall 48 of cone 46 and porous bottom wall 20' of cone 16'. Cone 46 is conveniently secured inside cone 16' by gluing or stitching or the like and the height of its peripheral wall 50 is preferably reduced, relative to the height of inner cone 16' in the same manner and for the same reasons mentioned above. In use, hot water flows into device cone 40 and sequentially downwardly through porous wall member 48, coffee 44, porous wall member 20', ion exchange resin 14' and out through porous wall member 24'. Any or all of compartments 12, 12' and 42 can be segmented in order to maintain a substantially even bed of coffee and/or resin across its compartment in order to reduce channeling of hot water as it flows downwardly through the device. Similarly, additional compartments for coffee and/or ion exchange resin can be provided above or below the illustrated compartments. It will also be apparent that both compartments 42 and 12' can be located inside or outside cone 16, rather than having one inside and one outside as shown in FIG. 2.

Figure 3:
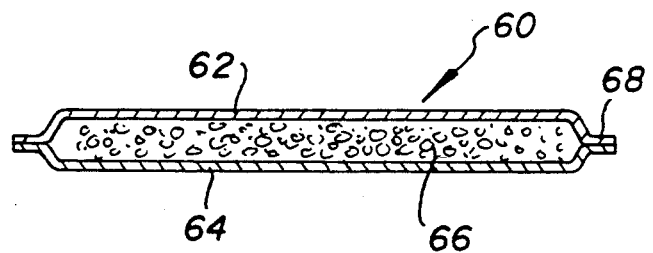
FIG. 3 is a diagrammatic sectional side elevation view of a third embodiment of a device for removing malic acid from an aqueous coffee extract.
Figure 4:
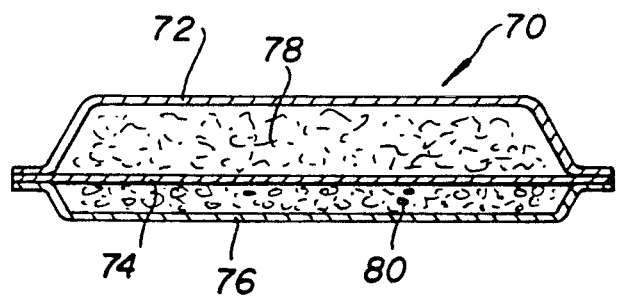
FIG. 4 is a diagrammatic sectional side elevation view of a fourth embodiment of a device for removing malic acid from an aqueous coffee extract.

Another type of infusion device widely used in home coffee brewers also of the filter paper type and usually circular in plan view, is illustrated in FIGS. 3 and 4. The devices are essentially the same as those of FIGS. 1 and 2 respectively, but lack a peripheral side wall and instead have a peripheral flange adapted to seat the device in a coffee brewer. Infusion bag 60 of FIG. 3 is made up of upper and lower circular sheets of porous filter paper members 62, 64 enclosing a predetermined quantity of ion exchange resin 66 in accordance with the invention. The sheets are sealed together with a continuous peripheral seal 68, such as by adhesive or by stitching forming a compartment for holding the ion exchange resin. Infusion device 70 of FIG. 4 is similar, but is formed of three sheets of porous filter paper members 72, 74, 76, forming upper and lower peripherally closed compartments 78 and 80 containing coffee and ion exchange resin, respectively. The sheets are joined together with a continuous peripheral seal 84 like seal 68 in FIG. 3. In use, infusion device 60 is placed in a coffee brewer and coffee is then placed on its upper surface. Hot water is then flowed through the device, thus flowing through the coffee. The brew then flows through the ion exchange resin as described above in connection with the infusion device of FIG. 2. Infusion device 70 is placed in a brewer with upper compartment 78 uppermost and a demalated brew is prepared as described above in connection with FIG. 2. The compartments in infusion devices 60 and 70 can be segmented as mentioned above in order to maintain a uniform bed depth of coffee and/or ion exchange resin across each compartment.

Figure 5:
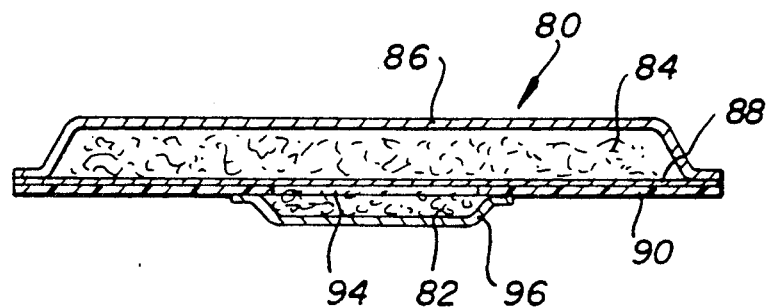
FIG. 5 is a diagrammatic sectional side elevation view of a modification of the device of FIG. 4.

Infusion device 80 of FIG. 5 is similar to the device of FIG. 4. In device 80, compartment 82 holding the ion exchange resin is reduced in size relative to compartment 84 holding the coffee. Coffee-holding compartment 84 is formed between peripherally sealed, circular sheets 86, 88 of water-permeable paper sheets 72, 74 like those of the device of FIG. 4. A sheet of water-impermeable material 90 is peripherally sealed underneath sheet 88. Sheet 90 is suitably made of a polymeric material such as polyethylene, polyvinylidine chloride, or the like. Several moisture barrier films are widely used in packaging and such films are generally suitable. Sheet 90 has one or more openings which permit a brew to pass downwardly into compartment 82. In the illustrated embodiment, sheet 90 is provided with a single, central circular opening 94. A third circular sheet 96 of water-permeable paper or the like is sealed at its periphery below sheet 90 just outside of the periphery of opening 94. In use, water flows downwardly through sheet 86 extracting soluble coffee solids from the coffee in compartment 84 and the coffee brew is guided by water barrier sheet 90 through opening 94 into ion-exchange resin compartment 82. Demalated coffee brew then flows downwardly out of the device through sheet 96.

Infusion devices according to the invention can be fabricated of flexible or rigid materials or a combination thereof. It is preferred to fabricate the present infusion device of a filter paper-type of material and it is preferred to use a heat-sealable type of filter paper material. The latter materials have a content of thermoplastic material such that, when the papers are heated while held together, they will become sealed. It is therefore preferred to join the cone-shaped member of FIGS. 1 and 2, and to form the peripheral flange of FIGS. 3 and 4, in this manner. Similarly, where the compartments are segmented, the segments are readily formed by heat sealing, preferably after the coffee and/or ion exchange resin is in position between two heat-sealable sheets of filter paper-type material.

What is claimed is:

1. A process for removing malic acid from a coffee product comprising contacting a malic acid-containing aqueous coffee extract with an ion exchange resin capable of exchanging malic acid in the aqueous extract, and recovering a malic acid-lean aqueous coffee extract having a reduced malic acid content.

2. A process according to claim 1 wherein the malic acid content of the aqueous coffee extract is reduced by at least 55%.

3. A process according to claim 1 wherein the malic acid content of the aqueous coffee extract is reduced by at least 80%.

4. A process according to claim 1 wherein said aqueous coffee extract comprises a green coffee extract.

5. A process according to claim 1 wherein said aqueous coffee extract comprises a brown coffee extract.

6. A process according to claim 1 further comprising the steps of
   (a) contacting malic acid-containing coffee solids with said malic acid-lean aqueous coffee extract to extract malic acid from the coffee solids to thereby form malic acid-depleted coffee solids and malic acid-containing aqueous coffee extract, and
   (b) separating the malic acid-containing aqueous coffee extract from the malic acid-depleted coffee solids to produce a coffee solids product having a reduced malic acid content.

7. A process according to claim 6 further comprising the steps of
   (c) contacting the malic acid-containing coffee extract separated from the malic acid-depleted coffee solids in step (b) with an ion exchange resin capable of exchanging malic acid in the aqueous extract, and
   (d) recovering a malic acid-lean aqueous coffee extract having a substantially reduced malic acid content.

8. A process according to claim 7 comprising carrying out step (a) using the malic acid-lean aqueous coffee extract recovered in step (d).

9. A process according to claim 8 further comprising repeatedly carrying out steps (a), (b), (c) and (d) in sequence, to produce a coffee solids product having a reduced malic acid content.

10. A process according to claim 6 wherein the malic acid content of the malic acid-containing coffee solids is reduced by more than 50%.

11. A process according to claim 6 wherein said malic acid-containing coffee solids comprise green coffee solids, and wherein said aqueous coffee extract comprises a green coffee extract.

12. A process according to claim 6 wherein said malic acid-containing coffee solids comprise roasted coffee solids, and wherein said aqueous coffee extract comprises a brown coffee extract.

13. A process according to claim 5 wherein said aqueous brown coffee extract comprises a ready-to-drink coffee beverage prepared by passing hot water through roast and ground coffee brew and wherein the extract is contacted with said ion exchange resin substantially immediately after the coffee brew is prepared.

* * * * *